Figure 6:
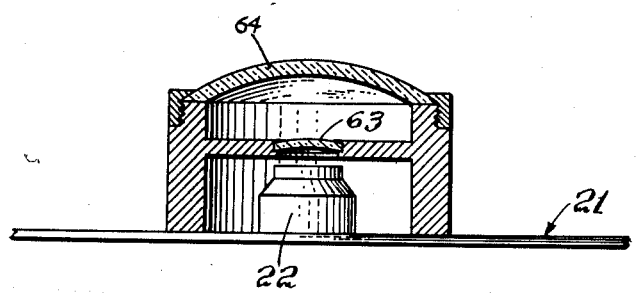

March 8, 1960     E. TRACHTMAN     2,927,517
PANORAMIC CAMERA
Filed June 6, 1958                         3 Sheets-Sheet 1
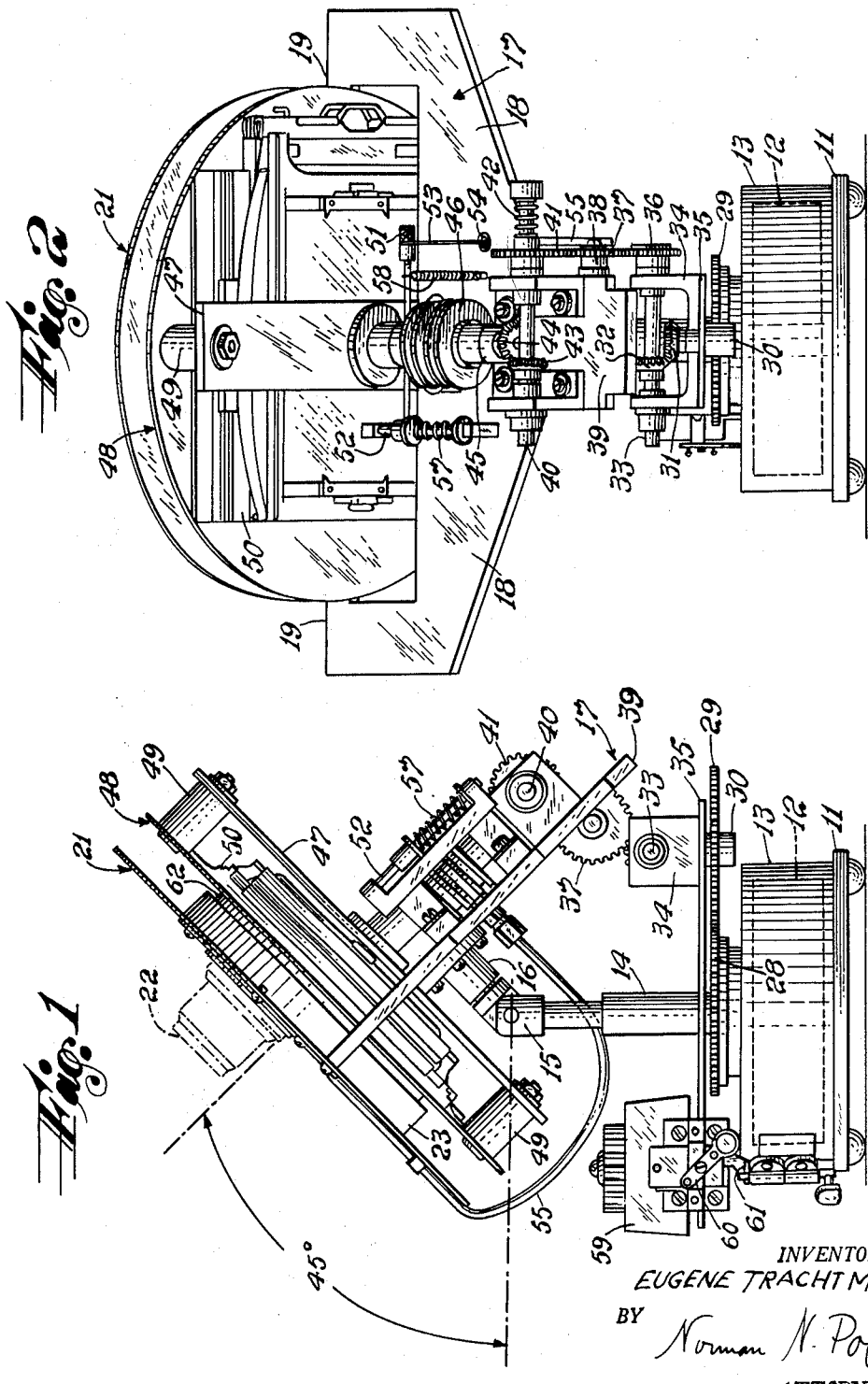
INVENTOR.
EUGENE TRACHTMAN
BY Norman N. Popper
ATTORNEY March 8, 1960
E. TRACHTMAN
2,927,517
PANORAMIC CAMERA
Filed June 6, 1958
3 Sheets-Sheet 2
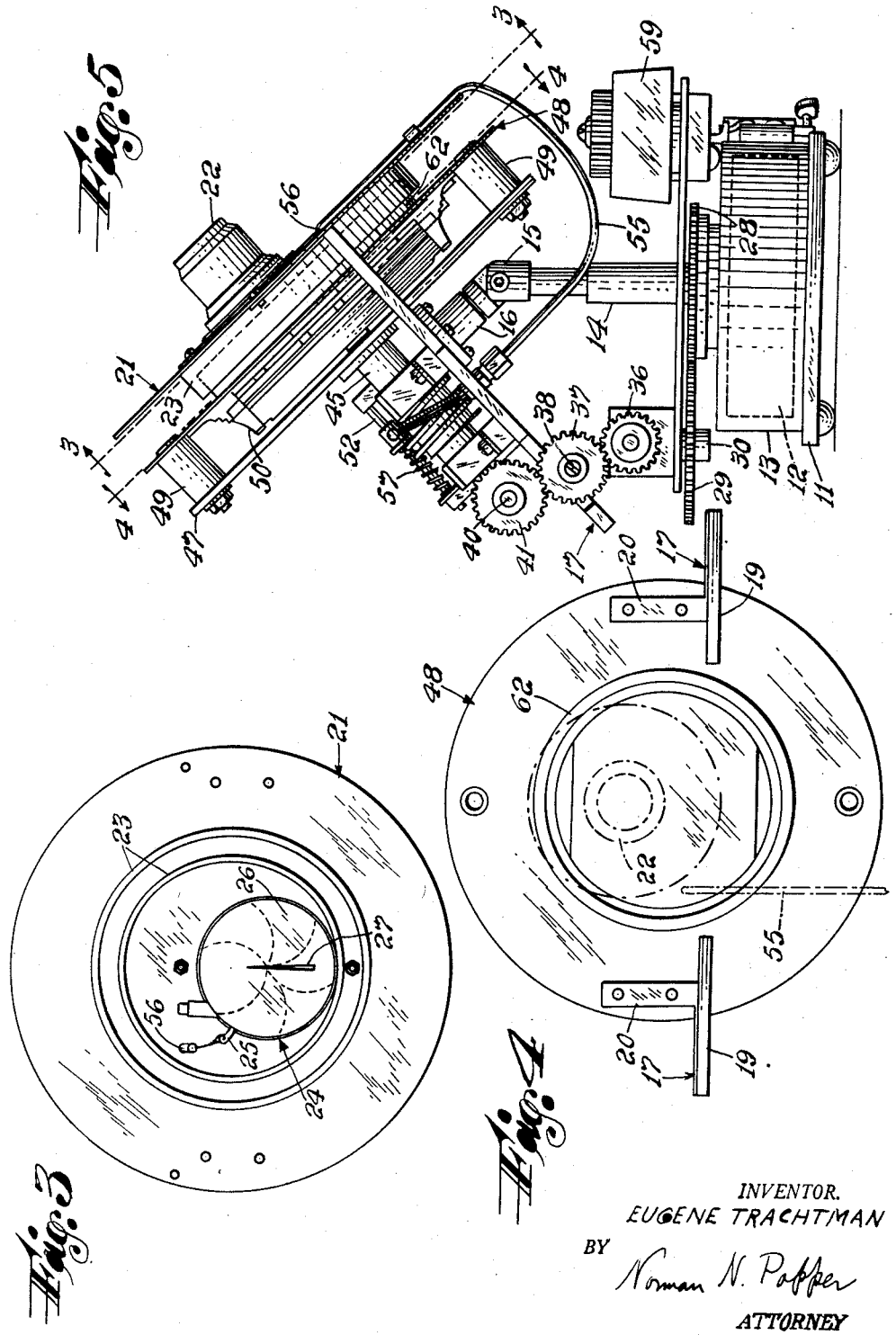
INVENTOR.
EUGENE TRACHTMAN
BY
Norman N. Popper
ATTORNEY March 8, 1960 E. TRACHTMAN 2,927,517
PANORAMIC CAMERA Filed June 6, 1958 3 Sheets-Sheet 3

INVENTOR.
EUGENE TRACHTMAN
BY Norman N. Popper
ATTORNEY

United States Patent Office 2,927,517
Patented Mar. 8, 1960

2,927,517
PANORAMIC CAMERA
Eugene Trachtman, Fair Haven, N.J.
Application June 6, 1958, Serial No. 740,385
13 Claims. (Cl. 95—15)

My invention relates generally to panoramic cameras and specifically to a panoramic camera which makes a flat photograph 360° horizontally of the area including zenith to the horizon.

It is among the objects of my invention to provide a camera which can record all images seen hemispherically when the camera is located at the center of the base of the hemisphere.

Another object of my invention is to provide a camera which will record all images seen hemispherically on a flat film plate.

Still another object of my invention is to provide a camera in which the image projected on the film plate or the film plate itself may be rotated to record a hemispherical picture.

Yet another object of my invention is to provide a camera in which a changing image is projected through a rotating slot onto a stationary film plate.

Still a further object of my invention is to provide a camera in which a changing image is projected through a stationary slot onto a rotating film plate.

Another object of my invention is to provide a camera which can photograph all images from slightly below the horizontal to zenith about a 360 degree circle in a horizontal plane.

A further object of my invention is to provide a camera which can photograph more than 360 degrees of hemispherical image about the base of the hemisphere within 360 degrees of a flat film plate.

Still another object of my invention is to provide a camera which will produce a flat picture of more than a 360° area which may be overlapped and folded into a cone to depict a 360° hemispherical picture.

Yet a further object of my invention is to provide a hemispherical panoramic camera which may employ standard optical and mechanical parts.

These objects and advantages as well as other objects and advantages may be achieved in the device illustrated in the drawings in which:

Figure 1 is a left side elevational view of my invention.
Figure 2 is a rear elevational view.
Figure 3 is an elevational view of the stationary lens mounting plate and shutter mechanism taken on line 3—3 in Figure 5 looking in the direction of the arrows.
Figure 4 is an elevational view of the rotatable film holder mounting plate taken along line 4—4 in Figure 5 looking in the direction of the arrows.
Figure 5 is a right side elevational view.
Figure 6 is a side elevational cross-sectional view of an optical lens system overlying the basic lens.

Referring now to the drawings in detail, my camera has a base 11. Secured to the base 11 is a horizontal spring 12 lying within a casing 13. The spring 12 is attached to a rotatable vertical center shaft 14 in such a manner as to cause it to rotate as the spring unwinds. The top of the vertical center shaft 14 is provided with an angularly adjustable coupling 15. A fixed connecting segment 16 is attached to the coupling 15 at one end and to a Y-shaped support member 17 at the other end. The support member 17 has a pair of horizontal arms 18—18 and inwardly projecting legs 19—19. L-shaped angle irons 20—20 are secured to the legs 19—19 and to the underside of a stationary, circular lens mounting plate 21. Thus the lens mounting plate is held in fixed relation to the shaft 14 and separate from a rotatable film holder plate 48. A standard wide angle lens 22 is secured to the top-side of the stationary lens mounting plate 21. The underside of the mounting plate 21 is provided with a pair of concentric upstanding flanges or light traps 23—23. Secured also to the underside of the lens mounting plate 21 and coaxial with the lens 22 is a standard shutter mechanism 24. Operatively connected to the shutter 24 is a release ram 25. Overlying the shutter 24 is an opaque disc 26 which is provided with a thin, wedge-shaped slot 27. The slot 27 extends substantially across the vertical diameter of the shutter 24 and has its thinnest portion pointing at the bottom of the lens 22. The slot 27 is adjustable to affect exposure time.

Secured to the spring casing 13 is an immovable, horizontal gear 28. Engaged with the gear 28 is a planetary gear 29 which rotates a vertical shaft 30. At the top of the shaft 30 is a bevel gear 31 which is engaged at right angles to a second bevel gear 32. The second bevel gear 32 is secured to a horizontal shaft 33. The shaft 33 is supported by a U-shaped mount 34 which is in turn secured to a horizontal platform 35. The platform 35 is attached to the vertical center shaft 14 so as to rotate therewith. Secured to one end of the horizontal shaft 33 is a gear 36 which engages with an idler gear 37. The idler gear 37 is mounted on the end of a shaft 38 which is secured to the base 39 of the Y-shaped support arm 17. Mounted also on the base 39 of the Y-shaped support arm 17 is a second horizontal shaft 40. The end of the shaft 40 is provided with a clutch gear 41 which may engage with the idler gear 37. The clutch gear 41 may be disengaged from the idler gear 37 by sliding it outwardly along the shaft 40 against the urging of the spring 42. This permits rotation of the rotatable film holder mounting plate 48 independently of the center shaft 14.

Secured to the second horizontal shaft 40 is a bevel gear 43 which engages at right angles with another bevel gear 44. The bevel gear 43 is secured to the end of a cam shaft 45. A helical, grooved cam surface 46 is secured to the cam shaft 45. The end of the cam shaft 45 opposite the bevel gear 44 is attached to a radial drive arm 47. The drive arm 47 is secured at both ends to the circular, rotatable film holder mounting plate 48 through a pair of separator bushings 49—49. A conventional film plate holder frame 50 is attached to the underside of the rotatable plate 48. Secured also to the opposite side of the film holder plate 48 is an upstanding flange or light trap 62 which fits between the light traps 23—23 on the stationary lens mounting plate 21. These flanges 23, 23, 62 cooperate as a conventional light trap between two moving elements.

The shutter mechanism 24 is controlled by the grooved cam surface 46. A cam-rider 51 is pivotally secured at one end to a shaft 52. The opposite end of the cam-rider 51 is attached to a flexible cord 53 which passes through a hole 54 in the support arm 17 into a tubular conduit 55 to the front of the stationary lens mounting plate 21. The cord 53 then passes through a hole 56 in the lens mounting plate 21 and is operatively secured to the shutter release arm 25. A spring 57, coaxial with the shaft 52 aids movement of the cam-rider 51 as it follows the helical cam surface 46. A spring 58 is attached between the cam-rider 51 and the support arm 17, and keeps the rider arm 51 in the track of the grooved cam surface 46.

The horizontal platform 35 is provided with a weight 59 to insure an even rotation of the platform 35, as well as the vertical center shaft 14, the parts attached to it, and to parts such as the rotatable film holder plate 48 which are geared to the planetary gear 29. Attached also to the platform 34 is a standard delayed action release mechanism 60, which is designed to engage an arm 61 secured to the spring casing 13.

My camera operates in the following manner. The camera is rotated about the vertical center shaft 14 by means of the spring 12 which may be wound up by rotating the shaft 14 in an opposite direction. The delayed action release mechanism 60 is set to release the camera for action after a time lapse sufficient to enable the operator to get out of the field or move to a remote position. When the time-release trips, the spring 12 causes the vertical center shaft 14 and the platform 35 to rotate. The lens 22 has been previously adjusted so as to be inclined at the angle at which a vertical light ray passing through the optical peripheral edge at the highest point on the lens will be coaxial with the axis of rotation of the shaft 14. In other words, a projection of the axis of rotation of the shaft 14 will pass through the optical peripheral edge of the lens at its highest point. The lens is therefore able to see directly overhead, and, since it can comprehend an angle of about 103 degrees, it can also see to a point slightly below the horizontal. As a result of this positioning, the lens scans the area from the vertical to a point slightly below the horizontal as it rotates through 360 degrees. Thus, the lens sees a hemisphere as the camera rotates on the vertical center shaft 14 in a horizontal plane through 360 degrees.

The images seen by the lens as the camera rotates are photographed on the film plate in the following manner. As the camera rotates, the planetary gear 29 which is engaged with the stationary gear 28 rotates its shaft 30. This rotation is transmitted through the gear train including bevel gears 31, 32, the gear 36, the idler gear 37, the clutch gear 41, the bevel gears 43, 44, to the cam shaft 45 and the helical cam surface 46. The rotation of the cam shaft 45 causes the rotation of the radial drive arm 47, and, in turn, the rotation of the film holder mounting plate 48 and consequently the film plate itself. Thus the rotation of the film plate is in geared relation to the rotation of the camera in the horizontal plane.

The shutter 24 is opened and closed in the following manner. As the camera rotates in the horizontal plane, the cam rider 51 progresses along the helical, grooved cam surface 46. The cam surface 46 increases in diameter to a point and then decreases in diameter moving from one end of the helix to the other. As a result of this increase in diameter of the cam surface 46, the cam rider 51 is lifted upwardly, pulling on the cord 53 thus operating the shutter release arm 25 and opening the shutter 24. The cam surface is so designed that the shutter 24 remains open for one full rotation of the camera through 360 degrees or in some cases during about 450 degrees of rotation as will be more fully explained below. The shutter then closes by reason of a decrease in the diameter of the cam surface 46.

As the shutter 24 opens, an image of approximately 103 degrees from the vertical to slightly below the horizontal, passes through the lens 22 and shutter 24. However, because of the angle at which the lens 22 is inclined, the image will be distorted at all points but for a thin region in a vertical plane passing through the slot 27. The disc 26 masks the distorted area from the film plate. For this reason the opaque disc 26 with its thin slot 27 is disposed in a vertical plane behind the shutter. The slot 27 is wedge-shaped since the movement of the film plate at the center of rotation is slower that at the periphery. Therefore, the slot 27 must be widened gradually from the center to the periphery to equalize exposure time at all points. Consequently, a thin relatively undistorted wedge-shaped image is projected on the film plate. Since the film plate is rotating with the rotatable film holder plate 48, this thin wedge-shaped image which is constantly changing is wiped on the film to create a circular picture. The axis of rotation of the cam shaft 45, of course, passes perpendicularly through the center of rotation of the film plate. In order to record a circular picture wherein the image from directly overhead lies in the center, and the images from the horizontal lie on the periphery, (i.e. a hemispherical picture viewed from the center of the base plane), it is necessary to have the image from directly overhead strike the film plate at approximately its center of rotation. To achieve this, the relative position of the various elements in the camera and the angle of inclination of the lens may be adjusted accordingly.

Thus, if the camera be considered as lying on the base of a hemisphere and is rotating about the central axis of the hemisphere, all images seen on the surface of the hemisphere will be photographed as a circular picture on a flat film plate.

As the camera rotates in a horizontal plane, a point image will travel across the wedge-shaped opening and will be photographed on the film plate. Of course, in order to prevent blurring of the image, each point image must fall on the same spot on the film plate as the camera rotates. Therefore, it is most important that the rotation of the film plate be synchronized with the rotation of the camera in the horizontal plane. The primary lens 22 reduces the image size from the object size and projects the reduced image on the film plate. In order that all point images fall on the same spot on the film plate as the camera rotates, it is necessary that the ratio of the circumference of the image to the circumference of the object be the same as the ratio of the image size to the object size. Since the lens 22 is inclined at an angle to the horizontal, the ratio of the image circumference to object circumference is not the same as the ratio of the image size to object size as reduced by the lens. The result is that if the film plate were to rotate about 360 degrees as the camera rotates about 360 degrees, the picture would be blurred. Apparently, the angle of inclination of the lens is responsible for this condition. This may be shown through a trigonometric analysis of the image passing through the lens. If it is assumed that the lens is inclined at an angle of 45 degrees to the horizontal, the film plate travels too fast by a factor of the square root of 2 causing the point images on the film plate to change position and therefore blur. The resulting picture would appear much the same as a picture taken through an ordinary camera which was moved while the shutter was open. Therefore, the rotation of the film plate must be reduced by a factor of the reciprocal of the square root of 2, or the image size must be increased by a factor of the square root of 2 circumferentially. In the drawings, I have shown the rotation of the film plate to be slowed by means of the gear train from the planetary gear to the film plate. In such cases, the shutter remains open while the camera rotates through 450 degrees in a horizontal plane. This produces a circular, 360 degree picture showing 450 degrees of the object. Therefore, there is a repeat of about 90 degrees of the object. It is also possible to synchronize the rotation of the camera and of the film plate by constricting the image radially by means of an additional lens system similar to the lens system which would expand the image circumferentially. In cases where 450 degrees of object are shown it is possible to cut and fold the picture to eliminate the repeated portion. The cone itself may then be photographed to produce a flat picture showing 360 degrees of object, or the picture may be viewed while folded as a cone to eliminate the repeated portion. Dramatic results may be obtained by greatly enlarging the original film with the repeated portion and then folding it as a cone. The cone may be made large enough for one or more persons to stand within it to view the hemispherical scene as it actually appears. Synchronization may also be accomplished by distorting the picture optically either radially or tangentially. Such synchronization may be accomplished by the lens system similar to that shown in Figure 6. Figure 6 shows a pair of lenses mounted on the stationary lens mounting plate 21 over the standard camera lens 22. In the case where the image projected on the film plate is to be distorted tangentially, the upper lens 64 is a convex, cylindrical positive lens while the lower lens 63 is a concave, cylindrical negative lens. There is no power in this lens system along its axis. Therefore, its axis is positioned parallel to the slot 27. In the alternative, the lenses 64 and 63 may be interchanged and the axis positioned at right angles to the slot 27. In the first instance, the image is expanded tangentially or circumferentially while in the second instance the image is contracted radially. The net effect of either lens system is to maintain the ratio of the image circumference to the object circumference equal to the ratio of the image size to the object size when the lens and the film plate are rotating 360 degrees each. Thus, the blurring due to improper synchronization of the rotation of the film plate and the image is eliminated. Both of these lens systems will photograph a hemispherical picture of 360 degrees on a flat circular picture of 360 degrees. Thus there is no overlap in the film picture as in the case where the rotation of the film plate is slowed by the use of gears as shown in Figures 1, 2, and 5.

A Dove prism may also be employed to synchronize the image and film plate movements. It is well known that such a lens may be ground to either slow up or speed up the rotation of the image relative to the object as the prism is rotated about its axis. Such a Dove prism may be interposed anywhere in the path from the object to the film plate. Although I have not shown such a Dove prism in the drawings, I comprehend it as being within the scope of this invention.

It should be understood that the principle and spirit of my invention may be embodied in modifications of the apparatus shown and described. For instance, it would be a matter of choice to employ a Dove prism to rotate the image in opposition to the rotation of the object as the camera rotates. Thus the film plate and the image are held stationary. In such a case, of course, the slot 27 would rotate.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A panoramic camera comprising a lens rotatable about an axis, a rotatable film plate located behind the lens and in light-interrupting relationship to light rays passing through the lens, the center of rotation of the film plate being the point of intersection of the film plate with the continuation of a straight line between the intersection of the principal surface of the lens with the axis of rotation of the lens and the focal point of the lens located between the film plate and the lens, said film plate rotating in the plane of image-focus of the lens, and means for rotating the lens and film plate in synchronization with each other.

2. A panoramic camera in accordance with claim 1 comprising a shutter located in light interrupting relation to the film plate, and means for opening and closing the shutter in synchronization with the rotation of the lens.

3. A panoramic camera comprising a lens rotatable about an axis passing through the lens, a rotatable film plate located behind the lens in such a position that a ray of light entering the lens coincident with the axis of rotation of the lens will strike the film plate at the center of rotation of the film plate, said film plate rotating in the plane of image-focus of the lens, and means for rotating the lens and film plate in synchronization with each other.

4. A panoramic camera in accordance with claim 3 and an opaque disc located between the lens and film plate provided with a wedge-shaped slot, and means for rotating the lens and film plate in synchronization with each other.

5. A panoramic camera in accordance with claim 3 and an opaque disc located between the lens and the film plate provided with a wedge-shaped slot, a shutter located between the lens and film plate, means for opening and closing the shutter in synchronization with the rotation of the lens, said film plate rotating relative to the lens and in synchronization with an ever-changing image passing through the lens and focused upon the film plate.

6. A panoramic camera in accordance with claim 3 and means for rotating the lens and film plate in synchronization with each other to produce a circular picture, and optical means to tangentially distort the circular picture focused upon the film plate.

7. A panoramic camera in accordance with claim 6 comprising an opaque disc between the lens and the film plate provided with a wedge-shaped slot, a shutter located between the lens and the film plate, and means for opening and closing the shutter in synchronization with the rotation of the lens.

8. A panoramic camera in accordance with claim 3 and means for rotating the lens and film plate in synchronization with each other to produce a circular picture, and optical means to radially distort the circular picture focused upon the film plate.

9. A panoramic camera in accordance with claim 3 comprising a shutter located in light interrupting relation to the film plate, and means for opening and closing the shutter in synchronization with the rotation of the lens.

10. A panoramic camera in accordance with claim 3 comprising an opaque disc between the lens and the film plate provided with a wedge-shaped slot.

11. A panoramic camera comprising a lens rotatable about an axis, a film plate located behind the lens and in light-interrupting relationship to light rays passing through the lens, whereby an ever-changing image is focused upon the film plate, means for effecting relative rotational movement between the film plate and the ever-changing image focused thereon, the center of said relative, rotational movement lying on an axis perpendicular to the film plate and passing through that point on the film plate formed by the intersection of the film plate with the continuation of a straight line between the intersection of the principal surface of the lens with the axis of rotation of the lens and the focal point of the lens located between the film plate and the lens, said film plate rotating in the plane of image-focus of the lens, and means for rotating the lens and film plate in synchronization with each other.

12. A panoramic camera comprising a lens rotatable about an axis, a stationary film plate located behind the lens and in light-interrupting relationship to light rays passing through the lens, whereby an ever-changing image is focused upon the film plate, means for rotating the ever-changing image focused upon the film plate in synchronization with the rotation of the lens, the center of rotation of the image on the film plate being that point on the film plate formed by the intersection of the film plate with the continuation of a straight line between the intersection of the principal surface of the lens and the axis of rotation of the lens and the focal point of the lens located between the film plate and the lens, said film plate lying in the plane of image-focus of the lens, and means for rotating the lens and image in synchronization with each other.

13. A panoramic camera in accordance with claim 12 wherein the film plate and lens lie in parallel planes.

References Cited in the file of this patent

UNITED STATES PATENTS

| | | |
|---|---|---|
| 697,738 | Miller | Apr. 15, 1902 |
| 1,152,829 | Mueller | Jan. 8, 1918 |

FOREIGN PATENTS

| | | |
|---|---|---|
| 380,102 | Germany | May 24, 1922 |